United States Patent [19]
Smith, III

[11] Patent Number: 5,365,972
[45] Date of Patent: Nov. 22, 1994

[54] UNDERSEA HYDRAULIC COUPLING WITH BLEED VALVE

[75] Inventor: Robert E. Smith, III, Missouri City, Tex.

[73] Assignee: National Coupling Co., Inc., Stafford, Tex.

[21] Appl. No.: 100,455

[22] Filed: Jul. 30, 1993

[51] Int. Cl.⁵ .............................................. F16L 37/28
[52] U.S. Cl. ............................... 137/614.04; 251/149.8
[58] Field of Search ..................... 137/614.03, 614.04, 137/614.05, 614.02, 614; 251/149.1, 149.6, 149.8

[56] References Cited

U.S. PATENT DOCUMENTS

| | | | |
|---|---|---|---|
| 1,913,982 | 6/1933 | Fox. | |
| 3,422,864 | 1/1969 | Allinguant | 137/614 |
| 3,918,485 | 11/1975 | Weber et al. | 137/594 |
| 4,086,939 | 5/1978 | Wilcox et al. | 137/614.03 |
| 4,447,040 | 5/1984 | Magorien | 137/614.03 X |
| 4,637,470 | 1/1987 | Weathers et al. | 166/344 |
| 4,703,774 | 11/1987 | Seehausen | 137/614 |
| 4,745,948 | 5/1988 | Wilcox et al. | 137/614.05 |
| 4,813,454 | 3/1989 | Smith, III | 137/614.04 |
| 4,817,668 | 4/1989 | Smith, III | 137/614.04 |
| 4,854,615 | 8/1989 | Smith, III | 285/331 |
| 4,858,648 | 8/1989 | Smith, III et al. | 137/614.04 |
| 4,924,909 | 5/1990 | Wilcox | 137/614.05 |
| 5,015,016 | 5/1991 | Smith, III | 285/108 |
| 5,016,671 | 5/1991 | Barwise | 137/614 X |
| 5,099,882 | 3/1992 | Smith, III | 137/614.04 |
| 5,215,122 | 6/1993 | Rogers et al. | 137/614.04 |

OTHER PUBLICATIONS

EnerRing Resilient Metla Gaskets Design Manual.

Primary Examiner—Martin P. Schwadron
Assistant Examiner—Kevin L. Lee
Attorney, Agent, or Firm—Arnold, White & Durkee

[57] ABSTRACT

An undersea hydraulic coupling including a male member and a female member, each of the members having a poppet valve biased to a closed position. At least one of the members has a bleed passage through the poppet valve and a bleed valve which opens to allow hydraulic fluid at high pressure to escape through the bleed passage until the pressure is below a predetermined amount.

20 Claims, 3 Drawing Sheets

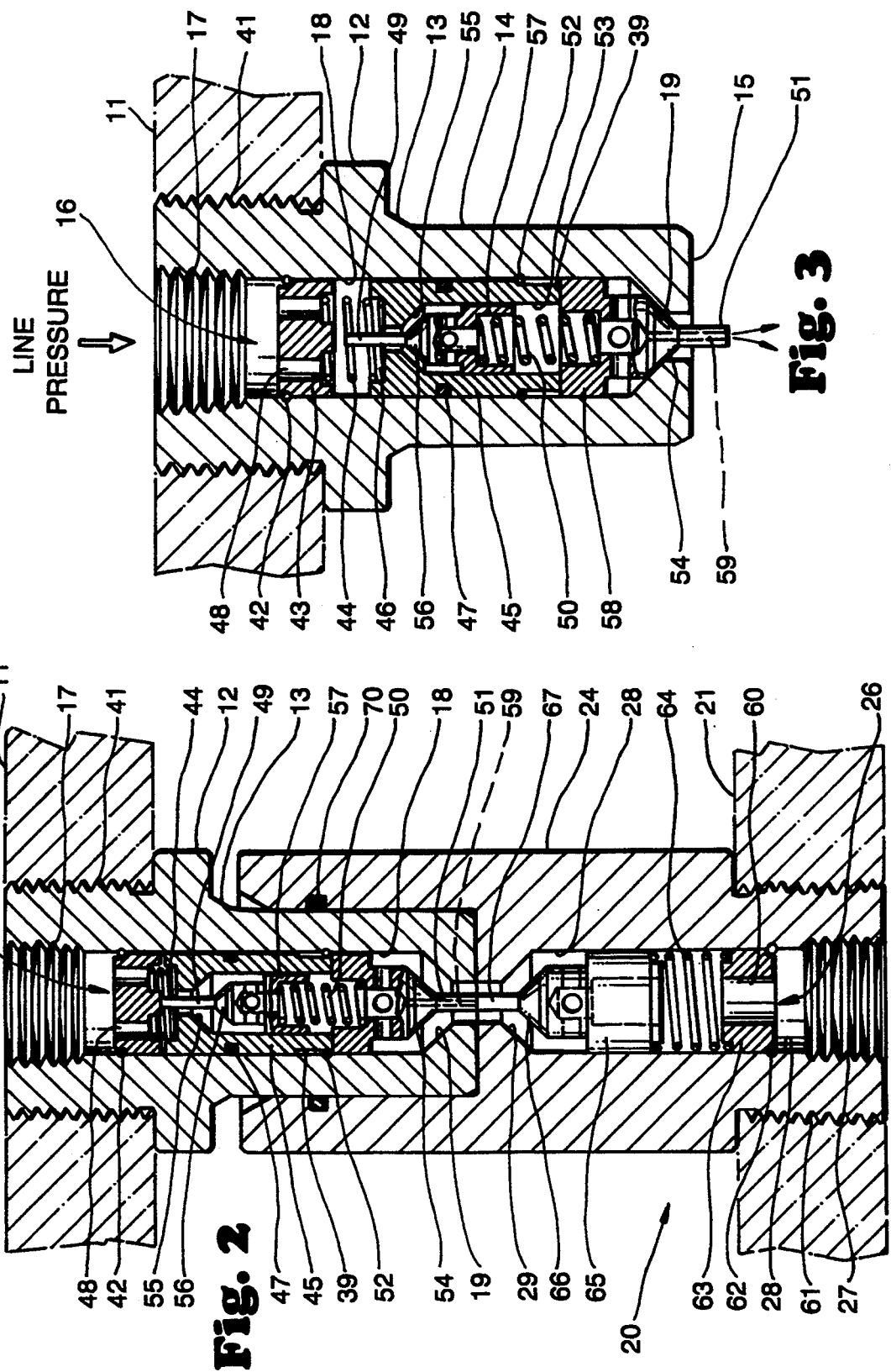

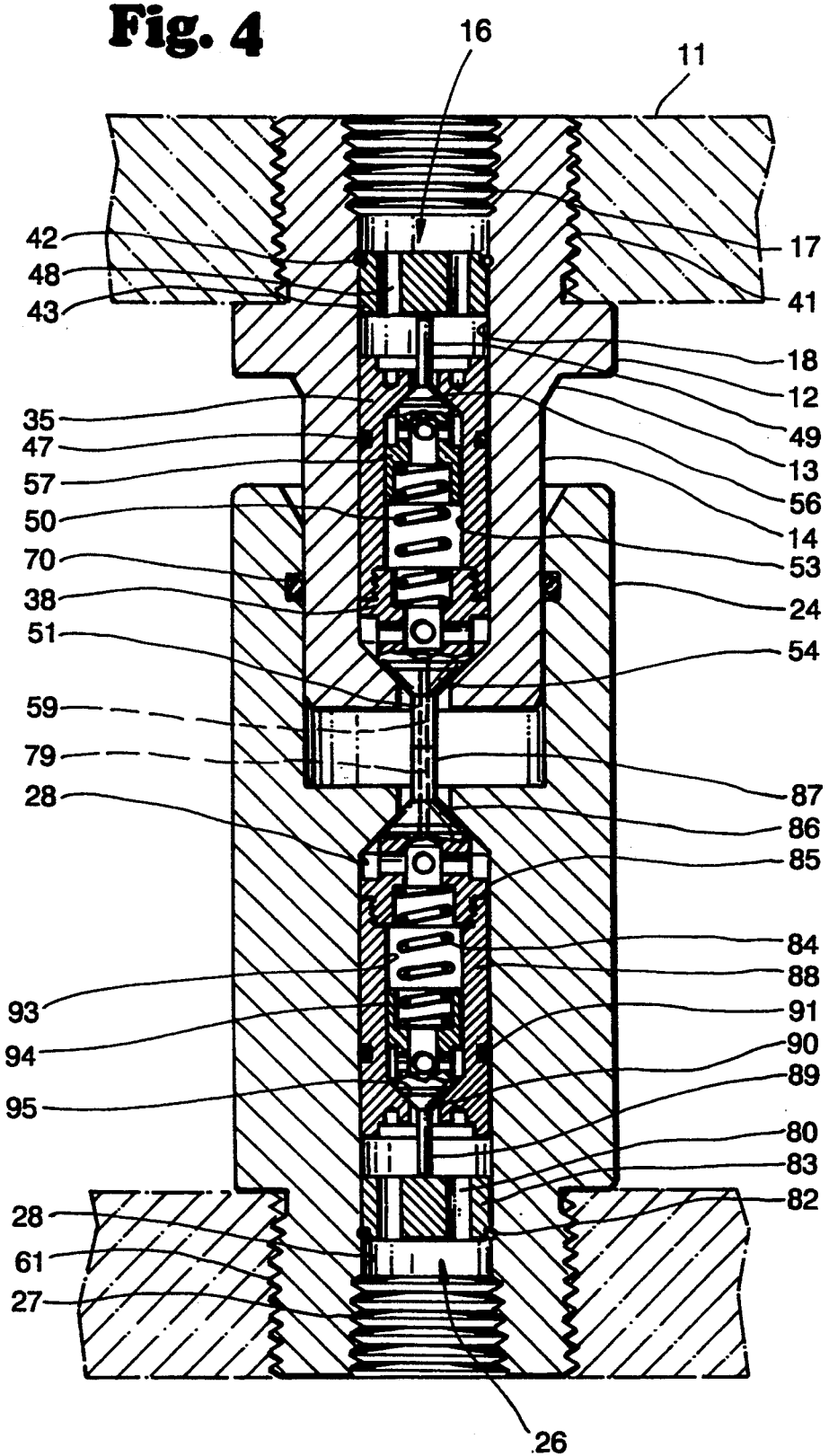

UNDERSEA HYDRAULIC COUPLING WITH BLEED VALVE

BACKGROUND OF THE INVENTION

1. Field of the Invention

This invention relates, in general, to hydraulic couplings, and specifically to hydraulic couplings used in undersea drilling and production applications. More particularly, the invention involves a remote bleed valve for a subsea hydraulic coupling for bleeding off hydraulic pressure and preventing sea water from entering the hydraulic system when the members of the coupling are disconnected.

2. Description of the Related Art

Subsea hydraulic couplings are old in the art. The couplings generally consist of a male member and female member with sealed fluid passageways connecting therebetween. The female member generally is a cylindrical body with a relatively large diameter longitudinal bore, or receiving chamber, at one end and a relatively small diameter longitudinal bore at the other. The small bore facilitates connections to hydraulic lines, while the large bore seals and slidingly engages the male member of the coupling. The male member includes a cylindrical portion at one end having an outer diameter approximately equal to the diameter of the large bore in the female member of the coupling. The male member also includes a connection at its other end to facilitate connection to hydraulic lines. When the cylindrical portion of the male member is inserted into the large bore of the female member, according to various embodiments of the device, fluid flow is established between the male and female members.

The male and female members of a hydraulic coupling each typically include a poppet valve slidably received within the bore of each member. Each poppet valve typically includes a conical valve face which seats, in the closed position, against a valve seat in the bore. The poppet valve opens to allow fluid flow, and closes the poppet valve face against the corresponding valve seat within the bore to arrest the flow. Generally the poppet valve is spring biased to the closed position. The valve also includes a valve actuator which may be a nose or stem extending from the apex of the valve face along the longitudinal axis of the poppet valve. Contact between the valve actuators of the male and female member poppet valves forces each valve face away from the valve seat and into the open position for fluid flow between the members.

Typically, the male members and female members are attached to opposing manifold plates. In emergency situations, for example storms, fires, hurricanes, etc., the manifold plates are quickly separated and the male and female members are disconnected. When the male and female members are disconnected, particularly in emergency situations, problems arise as a result of trapped hydraulic pressure in the lines. If hydraulic pressure is trapped subsea, the settings of various valves throughout the hydraulic system have a tendency to change in response to the built-up pressure. It is undesirable for the valve settings to unpredictably react to this trapped pressure, so to relieve the pressure it has been suggested to bleed the hydraulic lines that are trapped subsea. Bleeding the lines also is done to avoid damage from blowouts to the hydraulic system. Therefore, if the hydraulic system is in danger of being severed or otherwise damaged due to storms, it then is desirable to disconnect the members and check off or seal one member while allowing the other member, which remains subsea, to bleed off trapped hydraulic pressure. At the same time, it is undesirable for sea water to enter the system through the coupling member that remains subsea.

Bleeding off of trapped hydraulic pressure solves the problem of dangerous high pressure in the hydraulic system which often may result in blowouts to the hydraulic system as well as unpredictable shifting of valve settings. Preferably, to prevent seawater from entering the hydraulic system during bleeding, the bleed passage should include a check valve which permits flow in one direction only. The present invention solves all of these needs and requirements.

SUMMARY OF THE INVENTION

The present invention resides in a hydraulic coupling of the foregoing type, including male and female members for fluid communication therebetween such that when the members are disconnected, trapped fluid pressure may bleed off without allowing seawater to enter the coupling. The present invention involves an undersea hydraulic coupling having a bleed passage in the poppet valve and a bleed valve which allows trapped hydraulic fluid at high pressure to escape through the bleed passage until the hydraulic pressure is decreased to a predetermined pressure. The present invention keeps seawater intrusion out of the lines and subsea equipment, thereby preventing contamination and corrosion.

BRIEF DESCRIPTION OF THE DRAWINGS

FIG. 2 is a section view of a male member and a female member in the fully made up position, according to a first embodiment of the present invention.

FIG. 3 is a section view of a male member during bleeding of line pressure, according to a first embodiment of the present invention.

FIG. 4 is a section view of a male member and female member prior to complete make-up, according to a second embodiment of the present invention.

DETAILED DESCRIPTION OF PREFERRED EMBODIMENTS

Figure 1:
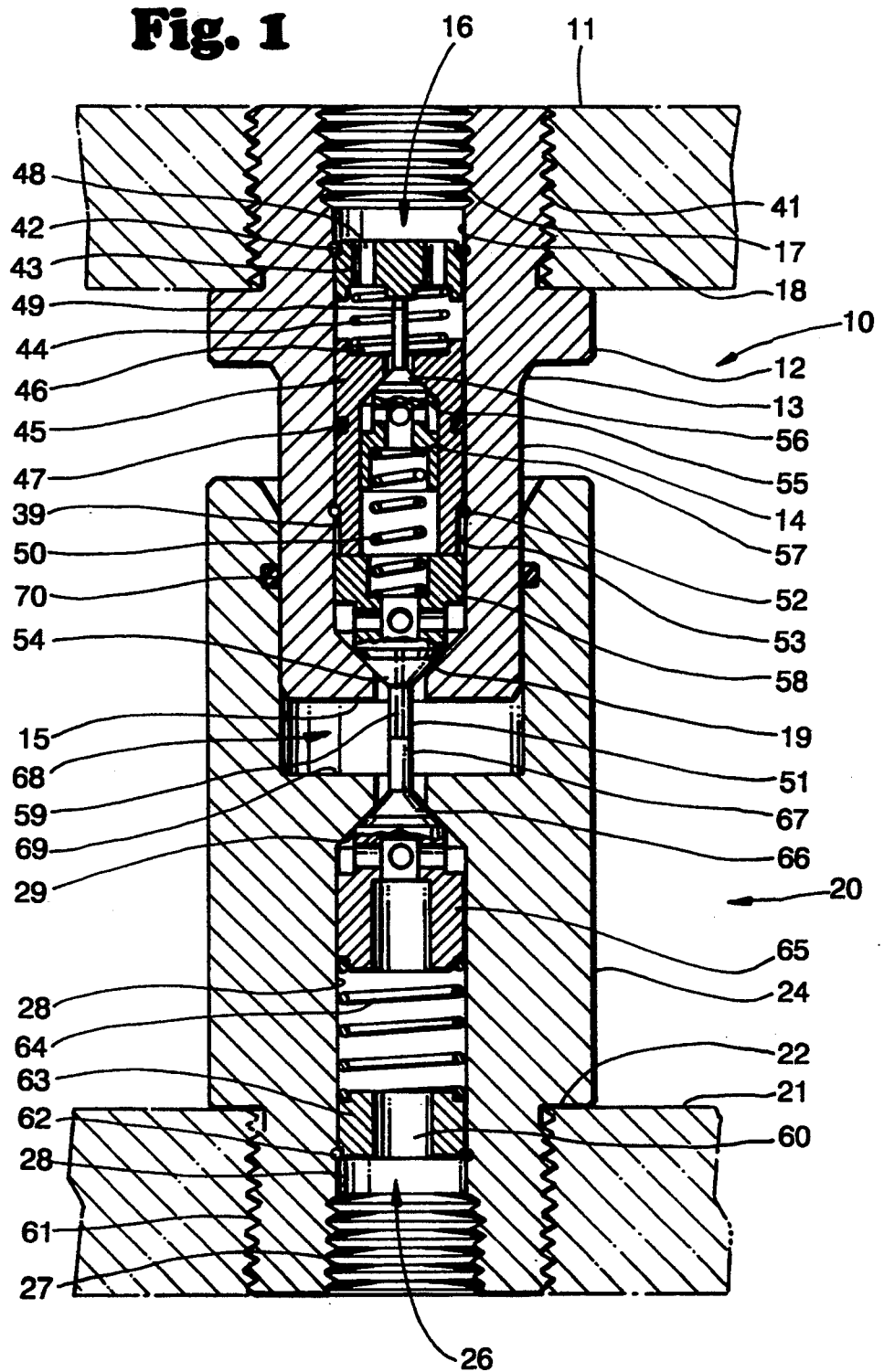
FIG. 1 is a section view of a male member and female member prior to complete make-up, according to a first embodiment of the present invention.

The coupling of FIG. 1 comprises a male member 10 and a female member 20. Typically, ten or more male members and female members are connected to opposing plates of a manifold which are held together by bolts or hydraulic members attached to the plates. The male members are commonly attached to one plate 11, while the female members are attached to an opposing plate 21 so as to face the male members and align with them. The male and female members may be attached to manifold plates using various means, such as set screws or threads. Techniques for attaching the members to such manifold plates are well known to those skilled in the art.

In a preferred embodiment, male member includes handle 41, flange 12, tapered shoulder 13, cylindrical probe wall 14, and probe face 15. The cylindrical probe wall 14 is adapted for sliding engagement with the female member, as will be discussed below.

The body of the male member also is provided with a central bore 16. The bore 16 may have several variations in its diameter as it extends through the body of male member 10. In a preferred embodiment, the first end of the central bore comprises an internally threaded section 17 for connection to a hydraulic line. Adjacent and inboard of the threaded section is a cylindrical passageway 18 extending longitudinally within the male member body and terminating at valve seat 19.

Poppet valve 58, as shown in FIG. 1, is biased to the closed position where conical valve face 54 seals against valve seat 19. Valve actuator 51 is a nose or stem which extends from valve face 54. Bleed passage 59 is a narrow diameter bore extending longitudinally through valve face 54 and actuator 51. Preferably valve 58 is urged closed by valve spring 50. When valve 58 is closed, hydraulic pressure is released through bleed hole 59 until the hydraulic lines have reached a predetermined pressure.

The pressure to bleed the lines is predetermined by the force necessary to close bleed valve 57. As shown in FIG. 1, bleed valve 57 is preferably a poppet valve, which is normally biased to the closed position where conical valve face 56 is sealed against valve seat 55. The bleed valve may be opened in response to high pressure in the line, until pressure bleeds out through bleed passage 59. Extending from the apex of the valve face 56 is valve actuator 49. During connection of the male and female members, sleeve 45 moves axially, moving valve seat 55 away from valve face 56, opening bleed valve 57 is opened.

In the embodiment of FIG. 1, the bleed valve assembly includes bleed valve 57 and sleeve 45. Bleed valve 57 slides within sleeve 45, which is configured to slide within cylindrical passage 18 of the male member. Sleeve 45 is a cylindrical body having a bore 53 extending therethrough. In a preferred embodiment, sleeve 45 has one or more seals 47, shown here as a single elastomeric O-ring, to seal between its outer circumference and bore 18. Preferably, sleeve 45 also has a narrowed section 39 which, in conjunction with keeper clip 52, limits the longitudinal travel of the sleeve within passage 18. Sleeve 45 may be urged axially to abut poppet valve 58, and to close bleed valve 57 against seat 55. The sleeve may be urged axially against poppet valve 58, by fluid pressure acting against outwardly facing cavity 46. Additionally, spring 44 may be provided to bias the sleeve axially against poppet valve 58. Also shown in FIG. 1 is sleeve retainer 43 which limits the longitudinal travel of sleeve 45, and has one or more flow passages 48 extending therethrough. The sleeve retainer 43 is anchored in the cylindrical passage 18 with keeper clip 42.

The female member 20 comprises body section 24, central bore 26, handle 61 which optionally is threaded to manifold plate 21 and external shoulder 22. Central bore 26 has several variations in its diameter as it extends through the body of the female member. At a first or outer end of the central bore 26 is a threaded internal passageway 27 for connection to a threaded hydraulic line. The threaded portion of the central bore terminates at cylindrical passageway 28 which slidably receives poppet valve 65. Cylindrical passageway 28 terminates at valve seat 28. When the conical face 66 of poppet valve 65 is urged closed, this prevents fluid flow through bore 26. Extending from the apex of valve face 66 is a valve actuator 67. When valve actuator 67 of the female member contacts valve actuator 51 of the male member, the poppet valves are forced into open positions for fluid flow between the male and female members.

The poppet valve 65 of female member 20 is urged closed against valve seat 29 by helical valve spring 64 which is mounted between spring collar 63 and poppet valve 65. Spring collar 63 has a flow passage 60 extending therethrough and may be anchored to bore 26 with keeper clip 62.

Now referring to FIG. 2 of the drawing, the male and female members are shown in a fully made-up position, according to a first embodiment of the present invention. As shown in FIG. 2, valve actuators 51, 67 are engaged to urge the respective valve faces 54, 66 away from valve seats 19, 29. This allows fluid communication between the male and female members. Preferably, fluid communication takes place at or shortly before the male member is fully inserted into receiving chamber 68 and may abut internal shoulder 69 of the receiving chamber. The male member may seal with the female member receiving chamber by annular seal 70 which may be an elastomeric O-ring, or other seal means.

When the poppet valve 58 of the male member is urged open, by contact of the opposing valve actuators, poppet valve 58 abuts sleeve 45, and moves the sleeve longitudinally to open bleed valve 57. Valve actuator 49 abuts sleeve retainer 43, to prevent longitudinal or axial movement of bleed valve 57. In the embodiment of FIG. 2, the longitudinal movement of sleeve 45 compresses spring 44.

When the male and female members are disconnected and poppet valves 58 and 65 are closed, fluid pressure in the hydraulic lines may still be high in one or both of the members. In the embodiment shown in FIGS. 1-3, high fluid pressure in the line to the male member is allowed to bleed through bleed passage 59 as long as bleed valve 57 remains open. The bleed valve is open because fluid pressure acting through bore 16 urges the face 56 of bleed valve 57 away from valve seat 55. At the same time, fluid pressure acting against outwardly facing cavity 46 urges the sleeve axially, in the same direction as the line pressure. In a first preferred embodiment helical spring 44 also urges sleeve 45 in the same direction as the line pressure as shown. Bleeding of fluid pressure through bleed valve 57 continues until the force of spring 50 exceeds the line pressure acting against valve face 56. This could be set at 100 or 200 psi, for example. By determining the force necessary to compress spring 50, the line can bleed to a desired pressure, until bleed valve 57 closes.

Now referring to FIG. 4, a second embodiment of the invention is shown. In the second embodiment, both male and female members have bleed passages. In the female member, bleed passage 79 extends longitudinally through valve actuator 87, which is a stem extending from the face 86 of poppet valve 85. In the embodiment of FIG. 4, poppet valve 85 is threaded to sleeve 88. Thus, poppet valve 85 and sleeve 88 are configured to move together as a unit. Sleeve 88 has an internal bore 93 extending therethrough, which terminates at seat 95. Bleed valve 94 in the female member has face 90 which is urged closed against seat 95. Valve 94 has a valve actuator 89 extending from the face 90, which contacts sleeve retainer 83. Sleeve retainer 83 has flow passages 80 extending therethrough, and is anchored with keeper clip 82.

In the embodiment of FIG. 4, fluid pressure acting through bore 26 of the female member urges valve face 90 away from seat 95 to bleed trapped fluid pressure.

This bleeding of trapped hydraulic fluid continues until the force of spring 84 exceeds the trapped fluid pressure.

The male member in the embodiment of FIG. 4 also includes a sleeve 35 threaded to poppet valve 38. The embodiment shown in FIG. 4 eliminates the need for a spring or other bias means to urge the sleeve axially to close the bleed valve.

In the embodiment of FIGS. 1-4, the fluid pressure against the bleed valve typically is sufficient to crack open the bleed valve a slight amount. Preferably, the sleeve surrounding the bleed valve is abutting or connected to the poppet valve, so that the sleeve moves axially a sufficient amount to open and close the bleed valve.

The bleed valve may be used with either or both of the male and female members, depending upon which member remains subsea upon disconnection. This allows trapped hydraulic fluid to bleed down to a preselected pressure, and prevents seawater from entering the lines remaining subsea.

A principal advantage of the bleed valve is bleeding of excess fluid pressure during emergency situations, when the male members and female members are disconnected. The plates of the manifolds often may be disconnected from one another to prevent damage to the hydraulic system. In a severe storm, for example, a floating drilling rig may be displaced substantially from the subsea coupling so that tearing loose or other damage to the hydraulic system will result unless the male member manifold plate is disconnected from the female member manifold plate. At the same time it is often difficult to quickly control or otherwise reduce pressure in all of the hydraulic lines before the male member and female members are disconnected from one another.

The bleed valve allows disconnection of subsea hydraulic couplings while allowing excess pressure to bleed off, thereby avoiding blowouts from excess pressure in the hydraulic lines. The bleed passage in either the male member or female member or both relieves excess pressure in the hydraulic system at any time when the subsea coupling members are disconnected from one another. Although a preferred embodiment of the present invention is specifically adapted for use in subsea applications, the present invention also may be used in other environments. Such environments include those in which the female and male members of a coupling are separated from one another without adequate pressure reduction in the lines. The resulting buildup of pressure in the lines is obviated by utilizing the bleed passage in the poppet valve nose section of either or both the male and female members.

Although variations in the embodiment of the present invention may not each realize all of the advantages of the invention, certain features may become more important than others in various applications of the device. The invention, accordingly, should be understood to be limited only by the scope of the appended claims.

What is claimed is:

1. An undersea hydraulic coupling, comprising:
a male member and a female member, each of the members having a poppet valve biased to the closed position, the poppet valves having mutually engageable valve actuators which urge the poppet valves open upon connection of the male and female members; at least one of the poppet valves having a bleed passage and a bleed valve assembly operable in response to fluid pressure, whereby fluid can escape through the bleed passage when the members are disconnected until the fluid pressure is below a preselected amount.

2. The undersea hydraulic coupling of claim 1 wherein the bleed valve assembly comprises a sleeve member having a valve seat, and a bleed valve insertable into the sleeve member and closeable against the valve seat, the sleeve member slidable axially to open the bleed valve upon mutual engagement of the valve actuators.

3. The undersea hydraulic coupling of claim 2 further comprising bias means between the bleed valve and the poppet valve.

4. The undersea hydraulic coupling of claim 1 wherein each of the valve actuators comprises a stem extending axially from the poppet valve, the bleed passage being through the stem.

5. The undersea hydraulic coupling of claim 2 further comprising bias means to urge the sleeve member axially to close the bleed valve against the valve seat.

6. The undersea hydraulic coupling of claim 2 further comprising a sleeve retainer attached to the body to limit axial sliding of the sleeve member when the bleed valve is open.

7. The undersea hydraulic coupling of claim 6 wherein the sleeve retainer has at least one flow passage therethrough.

8. An undersea hydraulic coupling, comprising:
(a) a female member having a bore for fluid flow therethrough, a receiving chamber at one end of the bore, a first normally closed valve for controlling fluid flow through the bore to the receiving chamber, the first valve having a valve actuator adapted to urge the first valve open upon application of axial force thereto; and
(b) a male member insertable into the receiving chamber, having a bore for fluid flow therethrough, second and third normally closed valves for controlling fluid flow through the bore, the second and third valves having valve actuators adapted to urge the valves open upon application of axial force thereto, the third valve also opening in response to fluid pressure in the bore at least as high as a predetermined pressure, and the second valve having a bleed passage whereby fluid flows past the open third valve and out through the bleed passage until fluid pressure in the bore is below the predetermined pressure.

9. The undersea hydraulic coupling of claim 8, further comprising a valve spring in each of the male and female members for urging the valves closed.

10. The undersea hydraulic coupling of claim 8, further comprising a sleeve member insertable into the male member bore and sealing with the bore, the third valve adapted to control fluid flow through the sleeve member to the bore and sealing with the sleeve member in the normally closed position, the second valve adapted to urge the sleeve member axially to open the third valve.

11. The undersea hydraulic coupling of claim 10, further comprising bias means for urging the sleeve member axially toward the first valve.

12. The undersea hydraulic coupling of claim 10 wherein the sleeve member is connected to the second valve.

13. The undersea hydraulic coupling of claim 8 wherein each of the valve actuators comprises an elongated section extending axially from the valve, the bleed passage extending through the valve actuator of the second valve.

14. The undersea hydraulic coupling of claim 10 further comprising a valve seat in the first end of the sleeve member, the third valve slidable within the sleeve member and sealing with the valve seat in the normally closed position.

15. A member of an undersea hydraulic coupling, comprising:
  (a) a body having a first bore extending therethrough and a first valve seat at one end of the first bore;
  (b) a first valve insertable into the first bore and biased to slide toward a closed position against the first valve seat;
  (c) a sleeve member insertable into the first bore and abutting the first valve, the sleeve member having a second bore extending therethrough and a second valve seat at one end of the second bore;
  (d) a second valve insertable into the second bore and biased to slide toward a closed position against the second valve seat and openable when fluid pressure in the first bore is at least as high as a predetermined amount; and
  (e) a bleed passage in the first valve whereby fluid bleeds out when the first valve is closed and the second valve is open in response to fluid pressure in the first bore at least as high as the predetermined amount.

16. The undersea hydraulic coupling member of claim 15, further comprising first and second valve actuators on the first and second valves, the first valve actuator being slidable axially to open the first valve and urge the sleeve member axially to open the second valve.

17. The undersea hydraulic coupling member of claim 15 further comprising a first spring between the first and second valves configured to bias the first and second valves toward the first and second valve seats.

18. The undersea hydraulic coupling member of claim 17 further comprising a sleeve retainer secured to the first bore, and a second spring between the sleeve retainer and sleeve member to bias the second valve seat toward the second valve.

19. The undersea hydraulic coupling member of claim 17 further comprising a sleeve retainer secured to the first bore, and wherein the sleeve member is attached to the first valve.

20. The undersea hydraulic coupling member of claim 16 wherein each of the first and second valve actuators comprise stems extending axially from the first and second valves.

* * * * *